Nov. 28, 1961   D. E. GETMAN   3,010,763
MINE TRUCK WITH SIDEWARDLY FACING SEAT
Filed July 18, 1960

INVENTOR.
DANIEL E. GETMAN
BY
Woodhams Blanchard and Flynn
ATTORNEYS 3,010,763
MINE TRUCK WITH SIDEWARDLY
FACING SEAT
Daniel E. Getman, South Haven, Mich., assignor to Getman Brothers Manufacturing Company, South Haven, Mich., a corporation of Michigan
Filed July 13, 1960, Ser. No. 43,625
1 Claim. (Cl. 298—17)

This invention relates in general to a dump truck having a sidewardly facing driver's seat and, more particularly, to a type thereof which is particularly adapted for use in a mine and which is completely and easily operated by the driver from his position in said seat.

It is well known that many types of heavy-duty, wheeled vehicles, such as earth-moving machines, are propelled as often in the reverse direction as they are in the forward direction. For the most part, the discomfort encountered by the vehicle operator, while guiding the movements of the vehicle in the reverse direction, are simply ignored. That is, when the vehicle is operated in reverse, it is usually necessary for the vehicle operator to twist his body and turn his head sufficiently that he can watch where he is going while continuing to operate the vehicle by means of pedals and steering apparatus which have been located in the vehicle primarily for forward operation. This arrangement is often dangerous and, at best, tends to accelerate driver fatigue.

In some instances, costly dual controls are provided for the operator so that he can completely shift his position each time the direction of movement is changed. In addition to the cost involved, this changing of positions is not only hazardous, but is almost as inconvenient as twisting around and operating the vehicle from the one set of controls.

Some attempts have been made, by means of special and costly modifications in existing vehicle structures, to provide controls which can be manipulated by the vehicle operator while he is in a sidewardly facing position. In such instances, the costliness of the arrangement and the added space often required to provide such arrangement are of little or no consequence in view of the particular use and size of the vehicle involved. That is, the type of vehicle in which reverse operation is often required is usually quite special in construction and expensive to build so that the custom modifications required in providing a sidewardly facing driver's seat and controls to match are not of major importance.

However, the type of truck used to remove ore and dirt from mines must be made to avoid certain problems which normally are not encountered by other types of vehicles, and especially trucks, which are frequently operated in the reverse direction. For one thing, it is necessary that the profile of a mine truck be relatively very low because of the height limitations encountered in mine drifts or passageways. More specifically, the top edge of the dump box must be low enough to permit movement of a shovel, mechanical or otherwise, between the upper edge of the dump box and the ceiling of the mine drift. It is also important that the overall profile of the vehicle be maintained as low as possible so that it can move along a passageway which has only walking head-room for the average workman.

Insofar as I am aware no vehicle has been previously designed specifically for the purpose of overcoming the above-discussed problem and meeting the special needs of mining, even though such need has been apparent during the many years that mining has been conducted by mechanized equipment.

Accordingly, a primary object of this invention has been the provision of a dump truck especially designed with a low profile for use in removing ore and other materials from a mine.

A further object of this invention has been the provision of a dump truck, as aforesaid, in which the seat and controls for the truck operator are arranged so the operator faces sidewardly while operating said controls so that he can easily observe the movement of the vehicle either forwardly or rearwardly, simply by turning his head slightly and without materially changing the position of his body with respect to said controls.

A further object of this invention has been the provision of a dump truck, as aforesaid, wherein the pedal controls and steering post are mounted upon a low-slung, sidewardly projecting control frame which permits the operator of the vehicle to use the controls while seated in a normal, comfortable sitting position, which is much closer to the ground than on existing vehicles for this purpose.

A further object of this invention has been the provision of a dump truck, as aforesaid, including apparatus for purifying the exhaust gases from the engine thereof before discharging same into the mine passageway, and having mechanism controlled by the operator from his position for raising the dump box and discharging the contents thereof.

Other objects and purposes of this invention will become apparent to persons familiar with this type of equipment upon reading the following descriptive material and examining the accompanying drawings, in which.

Figure 1:
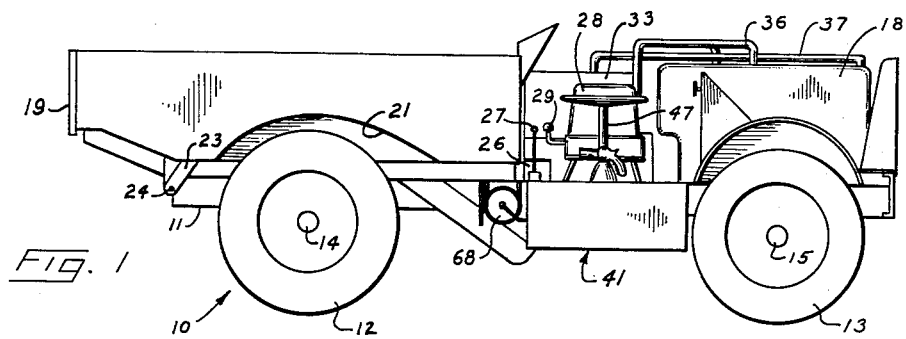
FIGURE 1 is a side elevation view of a dump truck embodying the invention.
Figure 2:
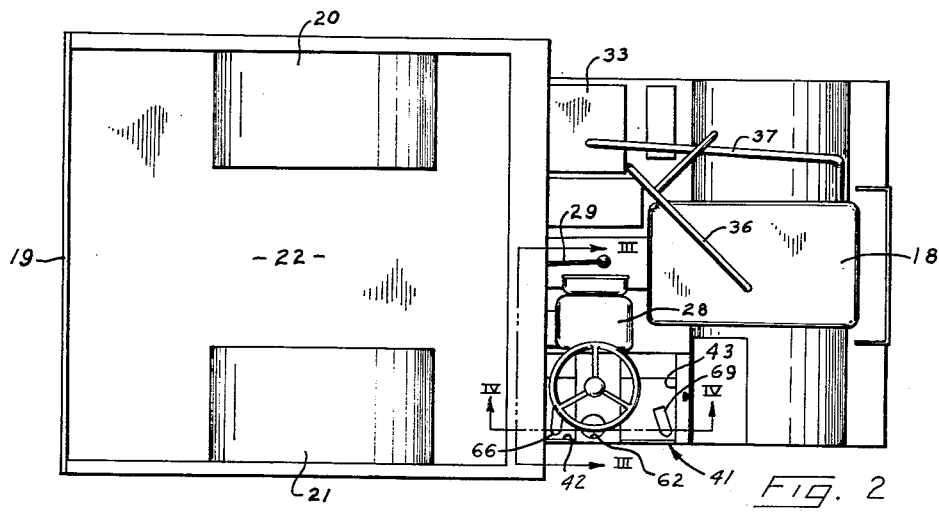
FIGURE 2 is a top plan view of the dump truck embodying the said invention.

For the purpose of convenience in the description, the terms "upper," "lower" and words of similar import will have reference to the dump truck of the invention in its normal position of operation, as appearing in FIGURE 1. The terms "inner," "outer" and derivatives thereof will have reference to the geometric center of the dump truck and parts thereof. The terms "front," "rear" and words of similar import will have reference to the right and left ends, respectively, of the dump truck of the invention, as appearing in FIGURES 1 and 2.

*General description*

The objects and purposes of the invention, including those set forth above, have been met by providing a four wheeled, self-propelled vehicle having a frame with an engine mounted upon the front end thereof and a dump box pivotally supported upon the rear end thereof. A sidewardly facing operator's seat is supported upon the frame between the engine and the dump box, and the various controls, which are operated by the driver of the vehicle, are arranged for convenient manipulation from the sidewardly facing seat. Moreover, many of these controls including the steering post are mounted upon a long-slung, especially designed control frame which is supported upon the one side of the vehicle frame between the front and rear wheels on said one side. An apparatus for purifying the exhaust fumes from the engine is mounted upon the vehicle frame behind the driver's seat.

Detailed construction

As shown in FIGURE 1, the dump truck 10 includes a frame 11 which is supported by four wheels, two of which are shown at 12 and 13, mounted upon the axles 14 and 15, respectively, which are in turn connected to the frame 11 in a substantially conventional manner. An engine 18 (FIGURES 1 and 2) is supported upon the front end of the frame 11 and a dump box 19 is supported upon the rear end of the frame 11. More specifically, the dump box 19 has a bottom wall 22 (FIGURE 2) to which pivot arms, one of which is shown at 23 in FIGURE 1, are rigidly secured near the rearward end and extend downwardly therefrom for pivotal engagement with the rod 24 supported upon the rearward end of the frame 11. The bottom wall 22 of the dump box 19 has a pair of spaced, upwardly extending wheel wells 20 and 21 into which the rear wheels, such as the wheel 12, are received for the purpose of lowering the profile of the truck.

Figure 3:
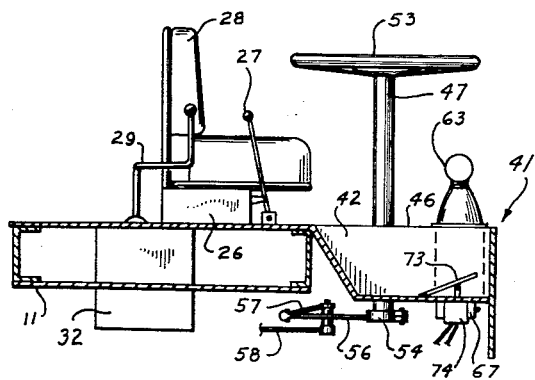
FIGURE 3 is a sectional view substantially as taken along the line III—III in FIGURE 2.
Figure 4:
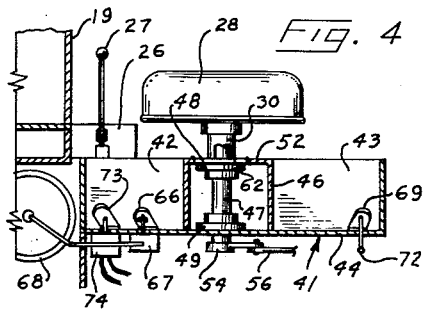
FIGURE 4 is a sectional view taken along the line IV—IV in FIGURE 2.

A sidewardly facing driver's seat 28 is supported upon, and near one side of, the frame 11 by a swivel post 30 (FIGURE 4) between the engine 18 and the dump box 19. The seat 28 can, by virtue of the post 30, pivot to a limited extent around the axis of said post. A hydraulic actuating mechanism 26, having a handle 27 (FIGURES 1 and 3), is mounted upon the frame for the purpose of raising the front end of the dump box 19 and thereby pivoting said box around the pivot rod 24. The handle 27 of the hydraulic actuating mechanism 26 is conveniently located between the seat 28 and dump box 19. The gear shift lever 29, which is connected to the transmission 32 in a substantially conventional manner, is bent and arranged so that it extends around the seat 28 into a convenient position for the operator of the truck 10 while he occupies the seat 28.

An apparatus 33 for purifying the exhaust fumes from the engine 18 is supported upon the frame 11 behind the seat 28 and is connected by the conduits 36 and 37 to the exhaust and intake manifolds (not shown) of the engine 18. The purification apparatus 33 may be substantially identical, at least in function, to the exhaust gas filter disclosed in Patent No. 2,911,289, assigned to the assignee of this invention.

A control support frame 41 (FIGURES 2, 3 and 4) is mounted upon the vehicle frame 11 and extends sidewardly and downwardly therefrom between the front wheel 13 (FIGURE 1) and the front end of the dump box 19. The control frame 41 includes a pair of upwardly opening compartments 42 and 43 having a common bottom wall 44 and separated by a central housing 46 in which the lower end of the steering post 47 is rotatably supported by means of the bearings 48 and 49, which are mounted upon said bottom wall 44 and the top wall 52 of the housing 46. A steering wheel 53 is mounted upon the upper end of the steering post 47 for convenient engagement by an operator positioned in the seat 28. The lower end of the steering post 47 (FIGURES 3 and 4) may be connected to the turning mechanism of the front wheels of the truck 10 (one of which is the wheel 13) in any conventional manner such as by linkage including a pitman arm 54, a drop rod 56 and a conventional steering arm 57 supported upon the frame 11 and acting on the wheels through means including the usual tie rod 58. Inasmuch the turning mechanism associated with the front wheels of the truck 10 may be of any convenient conventional type, the exact details thereof and of the manner in which said wheels are connected to said turning mechanism are believed to be unnecessary to the disclosure of the invention.

The top wall 52 of the housing 46 has an opening 62 (FIGURE 4) for reception of a fire extinguisher 63 which rests upon the bottom wall 44.

A brake pedal 66 is mounted upon the bottom wall 44 within the compartment 42 and operates the valve assembly 67 which controls the flow of pressure fluid from the supply tank 68 to the vehicle brakes (not shown) in a substantially conventional manner. A clutch pedal 69 (FIGURE 4) is mounted upon the bottom wall 44 within the compartment 43 and connected by means including the linkage 72 to the transmission 32 (FIGURE 3) for substantially conventional purposes. An accelerator pedal 73 is mounted upon the bottom wall 44 within the compartment 42 and connected to the carburator (not shown) of the engine 18 in a substantially conventional manner by the actuating mechanism 74.

Operation

Under normal circumstances, the operation of the steering wheel 53, brake pedal 66, clutch pedal 69 and accelerator pedal 73, and the functioning of the parts associated therewith, will be substantially the same as they are in any general-purpose dump truck. Likewise, operation of the transmission 32 by the gear shift lever 29 and the raising and lowering the dump box 19 by the hydraulic actuating mechanism 26 may also be substantially conventional. However, it will be observed that, because of the peculiar location of these various operating controls and, more particularly, because of the existence of the control support frame 41, manipulation of these controls can be conveniently effected by an operator who is positioned in the sidewardly facing seat 28.

The offset location of the control frame 41 (FIGURE 3) permits the bottom wall 44 thereof to be substantially lower than the upper surface of the frame 11 where such wall would normally be located, if conventional, existing structures were utilized. Moreover, the control frame permits the operator of the vehicle to remain in a comfortable, sitting position during such operation while, at the same time, making it easy for him to pivot his seat slightly away from the sidewardly facing direction in order to observe either frontward or rearward movement of the vehicle. In no case is it necessary for the normal driver to twist his body for this purpose, and in most instances a completely safe, visual observation can be maintained merely by turning the head slightly into the direction of vehicle movement. More specifically, the operator of the vehicle can pivot his seat slightly around the swivel post 30, which supports the seat, and by flexing his knees slightly maintain complete pedal control over the brake pedal 66, clutch pedal 69 and accelerator pedal 73.

Although a particular, preferred embodiment of the invention has been disclosed above for illustrative purposes, it will be understood that variations or modifications of such disclosure, which lie within the scope of the appended claim, are fully contemplated.

What is claimed is:

In a self propelled dump vehicle for use in mine drifts having relatively low headroom, a frame supported by spaced wheel means, a relatively shallow dump box supported on one end of said frame, an engine housing supported on the opposite end of said frame, the inner ends of said dump box and engine housing being spaced apart to define an intermediate control compartment for the driver of said vehicle, wall means closing one side of said compartment, means in said compartment for seating the driver in a position close to the bottom of said compartment whereby the driver is concealed and protected between the ends of said dump box and said engine housing, said seating means being positioned to face the open side of said compartment and having a limited pivotal movement whereby the driver has ease of vision from said low seating means to the front, rear and side of said vehicle, a steering control for said wheel means projecting upwardly into said compartment in front of said seating means, and an upwardly opening foot well in front of said seating means, said well depending below the top of said frame to thereby provide protection for the feet and lower legs of the driver while at the same time providing normal leg room relative to the low seating means, said foot well comprising a pair of compartments, an accelerator pedal operatively mounted in the lower end of one of said compartments and a brake pedal mounted in the lower end of the other of said compartments, the operation of said pedals being facilitated by the normal leg room provided by said foot well.

References Cited in the file of this patent
UNITED STATES PATENTS

| | | |
|---|---|---|
| 1,786,560 | Burrows et al. | Dec. 30, 1930 |
| 1,870,632 | Kennedy | Aug. 9, 1932 |
| 1,878,851 | Holmes | Sept. 20, 1932 |